(12) United States Patent
Ramankutty et al.

(10) Patent No.: US 8,509,739 B2
(45) Date of Patent: Aug. 13, 2013

(54) ACCESS TECHNOLOGY INDEPENDENT IDENTIFIER GENERATION

(75) Inventors: Rajesh Ramankutty, Westford, MA (US); Sanil Kumar Puthiyandyil, Nashua, NH (US); Rajesh Velandy, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/488,703

(22) Filed: Jun. 5, 2012

(65) Prior Publication Data

US 2012/0244862 A1   Sep. 27, 2012

Related U.S. Application Data

(63) Continuation of application No. 12/541,385, filed on Aug. 14, 2009, now Pat. No. 8,238,877.

(60) Provisional application No. 61/088,941, filed on Aug. 14, 2008.

(51) Int. Cl.
*H04M 1/66* (2006.01)
*H04W 4/00* (2009.01)
*H04Q 7/00* (2006.01)

(52) U.S. Cl.
USPC .......................................... 455/411

(58) Field of Classification Search
USPC ............................. 455/411, 435.1
See application file for complete search history.

(56) References Cited

U.S. PATENT DOCUMENTS

| | | | |
|---|---|---|---|
| 7,043,241 B1 | 5/2006 | Sladek et al. | |
| 7,254,119 B2 | 8/2007 | Jiang et al. | |
| 7,346,684 B2 | 3/2008 | Borella | |
| 7,443,824 B1 | 10/2008 | Lipford et al. | |
| 7,965,693 B2 | 6/2011 | Jiang et al. | |
| 8,238,877 B2 * | 8/2012 | Ramankutty et al. | 455/411 |
| 2004/0114553 A1 | 6/2004 | Jiang et al. | |
| 2004/0153525 A1 | 8/2004 | Borella | |
| 2007/0189219 A1 | 8/2007 | Navali et al. | |
| 2008/0101291 A1 | 5/2008 | Jiang et al. | |
| 2009/0044257 A1 | 2/2009 | Zhao | |
| 2010/0041373 A1 | 2/2010 | Ramankutty et al. | |
| 2011/0225418 A1 | 9/2011 | Shipley et al. | |

OTHER PUBLICATIONS

Johnson, et al., Mobility Support in IPv6, pp. 1-96, Jun. 2004.

* cited by examiner

*Primary Examiner* — William D Cumming
(74) *Attorney, Agent, or Firm* — Wilmer Cutler Pickering Hale And Dorr LLP

(57) ABSTRACT

A network system for communicating with mobile nodes has multiple gateways that can operate with each using a different access technology. In an IPv6 system, the access gateways each provide an interface identifier to the mobile nodes using the same one or more keys and hash so that different the same interface identifier regardless of the access technology used. The access gateways can have multiple options for using keys and/or hashes to provide an interface identifier such that the method for determining the interface identifier is configurable.

20 Claims, 3 Drawing Sheets

ACCESS TECHNOLOGY INDEPENDENT IDENTIFIER GENERATION

CROSS-REFERENCE TO RELATED APPLICATION

This application is a continuation of application Ser. No. 12/541,385, filed on Aug. 14, 2009, which claims priority to provisional application Ser. No. 61/088,941, filed Aug. 14, 2008, entitled "ACCESS TECHNOLOGY INDEPENDENT IDENTIFIER GENERATION," which is incorporated herein by reference.

TECHNICAL FIELD

Systems and methods for providing access technology independent identifier generation for mobile nodes in telecommunication networks are disclosed.

BACKGROUND

Wireless networks are telecommunications networks that use both wire and radio waves to carry information from one node in the network to a one or more receiving nodes in the network. Cellular telephony is characterized by the use of radio cells that provide radio coverage for a set geographic area, with multiple cells arranged to provide contiguous radio coverage. The first generation of wireless telephone technology were analog mobile phones. As technology progressed a second generation (2G) of wireless service was introduced. The main difference between 1G systems and 2G systems were that radio signals in 1G networks were primarily analog, while 2G networks were digital. Second generation technologies were primarily based on time division multiplexed access (TDMA) and code division multiplexed access (CDMA). Networks that were upgraded to handle higher-speed data transfer are referred to as 2.5G and 3G networks. The 3rd Generation Partnership Project (3GPP) and the 3rd Generation Partnership Project 2 (3GPP2), respectively, developed GSM/UMTS and cdmaOne/CDMA2000 technologies. The next evolution is 4G technology, which appears to be a version of Universal Mobile Telecommunications System (UMTS).

Wireless communication systems and networks are used in connection with many applications, including, for example, satellite communications systems, portable digital assistants (PDAs), laptop computers, and mobile nodes (e.g., cellular telephones). One significant benefit that users of such applications obtain is the ability to connect to a network (e.g., the Internet) as long as the user is within range of such a wireless communication system. Current wireless communication systems use either, or a combination of, circuit switching and packet switching in order to provide mobile data services to a mobile node. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized." That is, the data is divided into separate segments of information, and each segment receives "header" information that may provide, for example, source information, destination information, information regarding the number of bits in the packet, priority information, and security information. The packets are then routed to a destination independently, based on the header information. The data flow may include a number of packets or a single packet.

By a mobile node's very nature on a wireless network, the mobile node can move around the network. In order for the mobile node to continue receiving information properly from the network, an agent can be used to provide mobility management. When a mobile node (e.g., a cell phone, PDA, or BLACKBERRY mobile device) is roaming on a wireless network, it can communicate with a visited network. This agent provides an address to the mobile node to identify the mobile node in the network. This address can be dynamically or statically assigned. Many issues can arise depending on the setup of the wireless network in keeping track of the mobile node and providing mobility management.

SUMMARY

A network system for communicating with mobile nodes has multiple gateways that can operate with each using a different access technology. The access gateways each provide an interface identifier to the mobile nodes using the same one or more keys received from the mobile nodes and a hash so that different access gateways can provide the same interface identifier regardless of the access technology used.

The access gateways can have multiple options for using keys and/or hashes to provide an interface identifier such that the method for determining the interface identifier is configurable.

Other features will become apparent from the following description, drawings, and claims.

DETAILED DESCRIPTION OF THE DISCLOSURE

Figure 1:
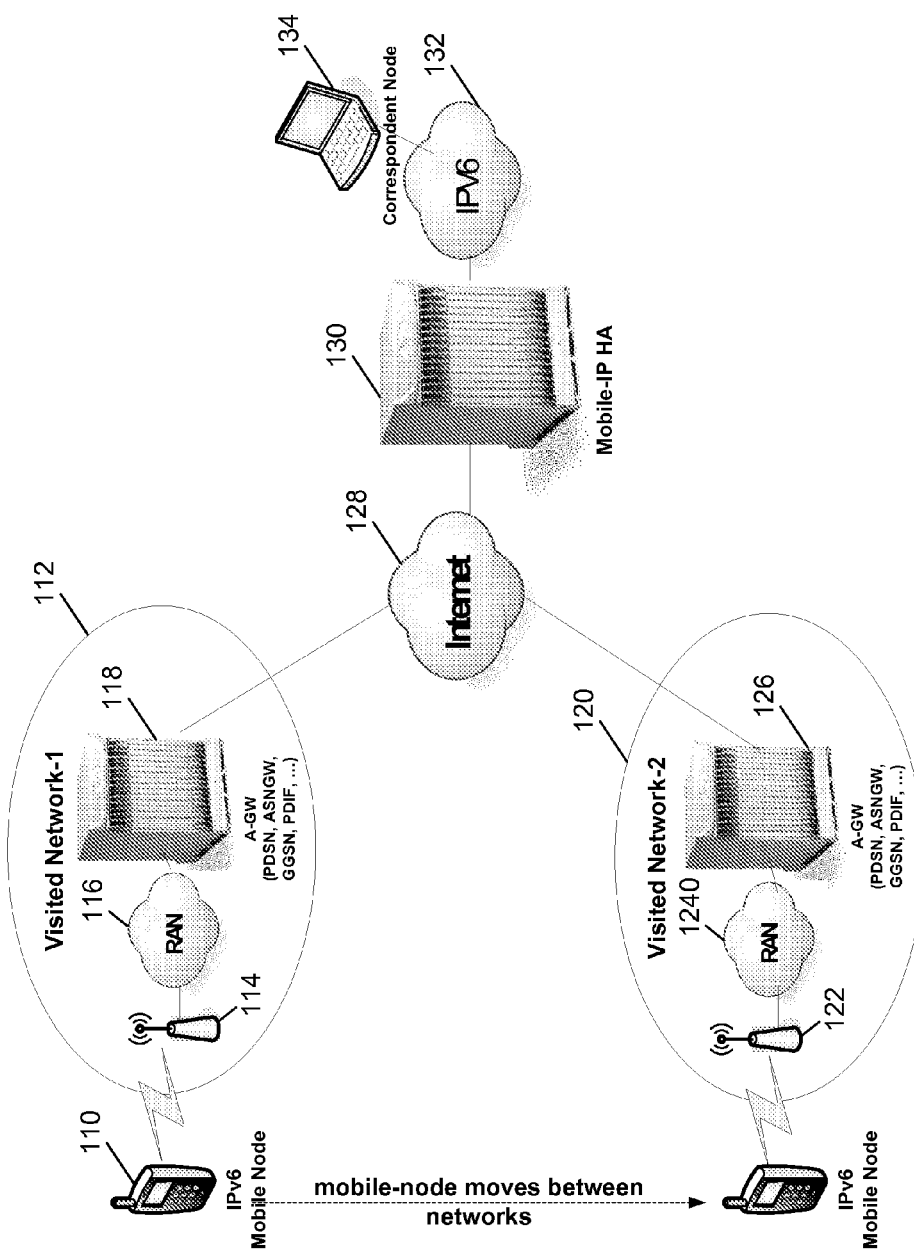
FIG. 1 illustrates a network configuration where a mobile node can be anchored at the same home agent when moving between networks in accordance with some embodiments.

Systems and methods are disclosed for generating an identifier for a mobile node that is independent of the access technology in accordance with certain embodiments. In providing mobility management to a mobile node, different protocols can be used. For example, Mobile Internet Protocol (MIP) is a protocol used in some networks that anchors the mobile node to a home agent such that the home agent relays information to the mobile node. When a mobile node roams in the network, the mobile node can move among different network devices that provide the network support. An access gateway can provide support with one or more access technologies. Access technologies determine the type of radio interface and equipment used in the radio access network and the mobile node to communicate wirelessly. A number of access technologies exist, such as WiMAX, WiFi for wireless LAN, CDMA, GSM, and UMTS, and these access technologies have different standards. The access gateway can provide mobility management while supporting more than one access technology.

A number of deployments can exist with mobility management on an access gateway supporting more than one access technology. One deployment is a statically configured interface identifier. This interface identifier can be derived by a key such as a MSID (mobile subscriber identification), an ESN (electronic serial number), a MEID (mobile equipment identification), an IMEI (international mobile equipment identity), and/or any applicable hard-coded identifier. The key is chosen to work among multiple access technologies, for example, a NAI (network access identifier) or a username. The interface identifier is used to create an identifier such as an IP address to identify the mobile node in the network. The identifier can also be used in creating a binding to a home agent, although the first deployment can be limited to being able to only engage in one binding or the creation of one address.

A second deployment is a dynamic one that allows a mobile node to connect to multiple networks because multiple identifiers can be generated. A dynamic assignment approach can use a hash function or other heuristic algorithm in conjunction with a set piece of information to generate one or more different interface identifiers. The second deployment can use an agreed upon key of the mobile node that is consistent across access technologies and use that key with a hash function to generate the identifier for the mobile node.

A network identifier that is globally unique for the mobile node, along with a hash function, can be used to generate an interface identifier. The interface identifier can then be used to create an identifier for the mobile node and one or more bindings for the mobile node. The bindings can be created by using another hash or other method to create one or more uniquely identifying bindings for a mobile node to connect with one or more different networks. An access gateway can use one or any combination of the above deployments in a given configuration.

FIG. 1 illustrates a network configuration where a mobile node can move across networks and still be anchored at the same Home Agent. FIG. 1 includes a mobile node 110, a visited network-1 112 with a base station 114, a radio access network (RAN) 116, and an access gateway (AGW) 118; a visited network-2 120 with a base station 122, a RAN 124, an access gateway 126. Networks 112 and 120 are then coupled to internet 128, a mobile IP home agent (HA) 130; an internet protocol version 6 (IPv6) network 132, and a correspondent node (CN) 134. Access gateways 118 and 126 can include one or more of a packet data serving node (PDSN), an access service network gateway (ASNGW), a gateway GPRS (general packet radio service) support node (GGSN), a packet data interworking function (PDIF), a user plane entity (UPE), and/or a HRPD (high rate packet data) serving gateway (HSGW). The access gateways can provide an interface identifier that is used in part to develop the identifier used by the mobile node.

Visited network-1 112 can employ a first access technology, while visited network-2 120 employs a second access technology. Mobile node 110 can be a dual mode or multimode device that can use at least both access technologies to access a network. One example is a mobile node that is CDMA and WiFi capable so that it can access a network using either a CDMA interface or a WiFi interface.

In the case of Mobile IPv6 (MIPv6) being used in the network, a Home Address (HoA) is used to identify the mobile node in the network. The HoA is assigned to the mobile node during a MIPv6 bootstrapping procedure with an access gateway in a visited network. The deployments described above can allow the same HoA or interface identifier to be given to the mobile node as the mobile node moves through the network. Generating the same interface identifier consistently across different access gateways allows the mobile node to preserve existing sessions when a handoff occurs between access technologies. Maintaining the interface identifier can also allow the same anchor to be chosen again for the mobile node, preserving the sessions running on the mobile node.

Figure 2:
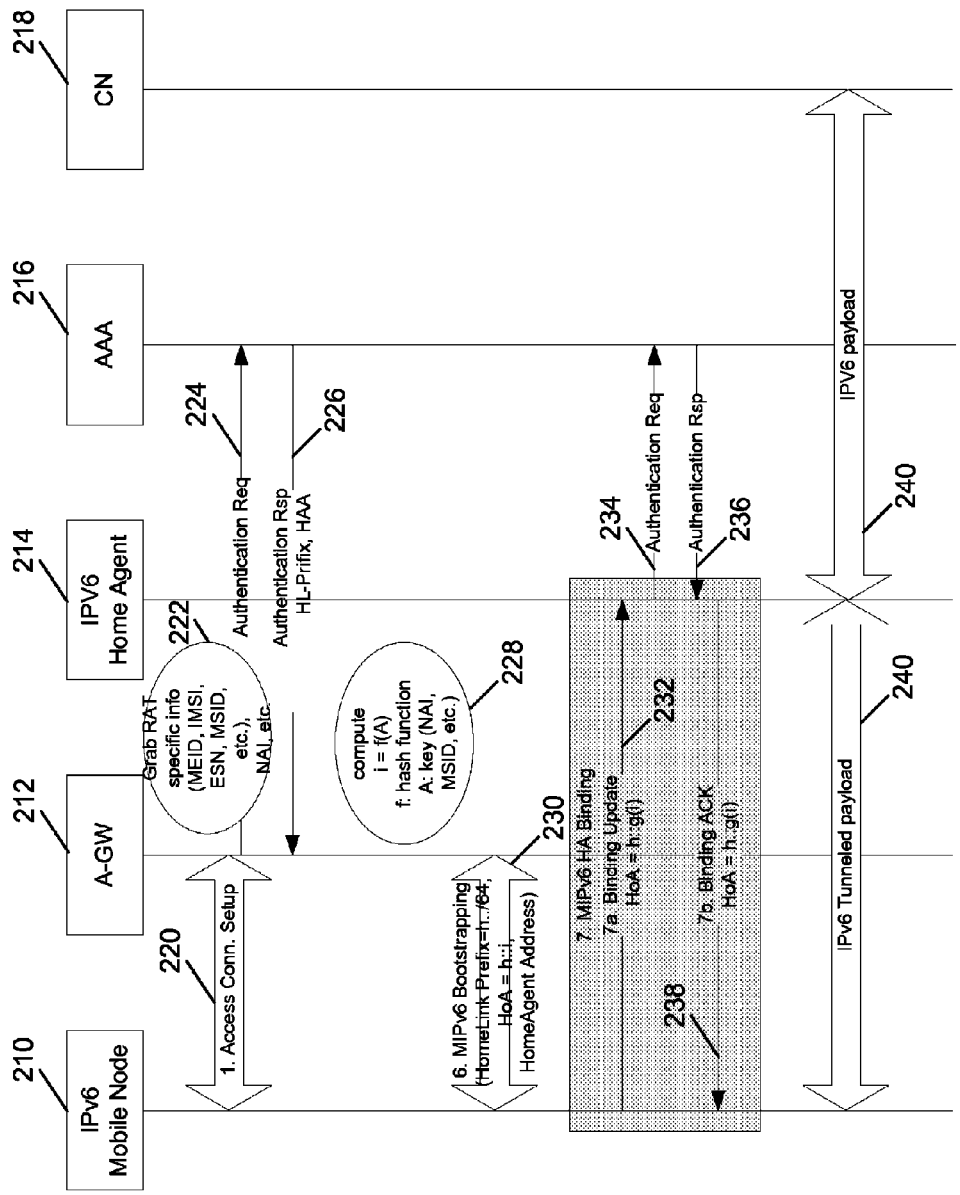
FIG. 2 illustrates a signaling diagram for setup of a connection to the mobile node in accordance with certain embodiments.

FIG. 2 illustrates a signaling diagram that show exemplary messages during connection setup. The network devices included in FIG. 2 are a mobile node 210, an access gateway (A-GW) 212, a home agent 214, an authentication, authorization, and accounting (AAA) server 216, and a correspondent node (CN) 218. In messages 220, mobile node 210 sets up an access connection with access gateway 212. At 222, the access gateway grabs information specific to the radio access technology (RAT) from mobile node 210. This RAT specific information can include MEID, IMSI, ESN, MSID, NAI, or any other applicable key.

Access gateway 212 sends an authentication request 224 to AAA server 216 to authenticate mobile node 210 and to obtain information used in developing an interface identifier for mobile node 210. The AAA server 216 sends an authentication response 226 that can include a home link (HL) prefix and a home agent address (HAA). At 228, the access gateway 212 computes an interface identifier "i", which is a function of one or a combination of keys (e.g., NAI, username, MSID, IMSI, etc.).

In messages 230, MIPv6 bootstrapping occurs between the access gateway 212 and mobile node 210. The bootstrapping process can use the home link prefix, the HoA, and the HAA. Bootstrapping can be used to allow the mobile node to discover its own address in the network.

In creating a binding with a home agent, mobile node 210 sends a binding update 232 to home agent 214. The binding update 232 includes a home address (HoA) that is a function of the "i" received from the access gateway 212. Making the HoA a function of "i" allows the mobile node to engage in multiple bindings. The mobile node 210 can have more than one binding at a time, and can even use more than one access technology at the same time. Mobile node 210 can also preserve sessions and keep the same interface identifier or HoA when changing from a first access technology to a second access technology.

Home agent 214 upon receiving binding update 232, sends an authentication request 234 to AAA server 216. AAA server 216 responds with an authentication response 236. Based on the information received, home agent 214 sends mobile node 210 a binding acknowledgement 238. After the binding is set up between the home agent 214 and mobile node 210, IP tunneled payload information 240 can be sent and received from correspondent node 218 via home agent 214. This payload information can be email, videos, voice over IP (VoIP) telephony, music, or any other applicable data.

In deployments using dynamic interface identifier assignment (e.g., dynamic HoA assignment), the mobile node upon connecting or reconnecting to a network, or after moving from one network to another network, receives the same interface identifier assignment. The mobile node also receives the same interface identifier assignment from the different access gateways. The assignment of the interface identifier is the same no matter the access gateway assigning the interface identifier or the access technology being used by the mobile node. For a HoA assignment, the access gateway knows, from a subscriber profile, about the home link prefix (HLP) for the mobile node, and the access gateway generates the same interface identifier every time the mobile connects or re-connects.

The access gateway can assign the same HoA to the same mobile node repeatedly by using a key (e.g., NAI, IMSI, MEID, MSID, etc.) obtained during access connection setup and apply a hash function (e.g., MD5, SHA, etc.) on the key to generate an interface identifier. If the key and the hash function used is the same in all the access gateways, then the mobile node receives the same HoA upon each connection or reconnection irrespective of the access gateway assigning the HoA and the access technology being used. Inter-technology mobility is supported by choosing a key that is available in the different technologies used by the mobile node, e.g., such choosing to use NAI or username.

The mobile node can connect to the access gateway for a packet data serving node (PDSN) functionality due to the access technology in use. In this case, during IPv6 control protocol signaling, the PDSN assigns a unique 64 bit interface identifier to the mobile node. If MIPv6 bootstrapping returns a home link prefix, the mobile node uses the interface identifier negotiated during IPv6 control protocol signaling with the home link prefix to create a unique globally routable unicast HoA. Because different PDSNs otherwise assign different interface identifiers this process can potentially lead to different PDSNs assigning the same interface identifiers to different mobile nodes with the same home link prefix. Such assignments could cause HoA conflicts in the home agent, and could also cause a mobile's interface identifier to change after a handoff, thereby causing a change in mobile's HoA. These potential issues can be prevented if the PDSNs generate a consistently reproducible unique interface identifier using the above mentioned procedure for each mobile node during point to point protocol (PPP) negotiation. For CDMA2000 calls, ESN or MEID are included in A11 signaling that uniquely identify the mobile device. The PDSN may use these identifiers or NAI to generate a globally unique interface identifier.

The access gateway can have multiple ways to determine an interface identifier, such that the way is configurable by a network operator in the access gateway. The gateway can thus optionally use one or more of multiple keys and/or implement one of a number of hashes, and which options are used can be determined by the operator. The options can include options that are required by standards, options that are optional and not required by any standard, and also options not specified in any standard.

The access gateway can perform multiple and different integrated functionalities. In some embodiments, an access gateway can be implemented in a network device with a packet data serving node (PDSN), a foreign agent (FA), or home agent (HA). Other types of functionalities can also be implemented on a network device in other embodiments are a Gateway General packet radio service Service Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A network device can include a PDSN, a FA, a HA, a GGSN, a PDIF, an ASNGW, a UPE, an IP Gateway, an access gateway, a HSGW, or any other applicable access interface device. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. In certain embodiments, a gateway device is provided by STARENT NETWORKS, Corp. of Tewksbury, Mass. on an ST16 or ST40 multimedia platform.

The gateway device can include slots for loading application cards and line cards. A midplane can be used in the gateway device to provide intra-gateway communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the gateway device implemented by establishing inter-card communications between application cards and line cards. The control bus interconnects the control and management processors within the gateway device. The gateway device management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The gateway device supports at least two types of application cards: a switch processor card and a packet accelerator card. The switch processor card serves as a controller of the gateway device and is responsible for such things as initializing the gateway device and loading software configurations onto other cards in the gateway device. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the gateway device provide input/output connectivity and can also provide redundancy connections as well.

In some embodiments, a ST40 embodiment of the gateway device can support a system management card (SMC) and a packet services card (PSC). The system management card is a system control and management card for managing and controlling other cards in the gateway device. The packet services card is a high-speed processing card that provides multi-threaded point-to-point, packet data processing, and context processing capabilities, among other things.

The operating system software can be based on a Linux software kernel and run specific applications in the gateway device such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, HSGW, or IPSG).

The gateway device's software can be divided into a series of tasks that perform specific functions. These tasks communicate with each other as needed to share control and data information throughout the gateway device. A task is a software process that performs a specific function related to system control or session processing. Three types of tasks operate within the gateway device in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway device by monitoring the various software and hardware components of the gateway device. Recovery control task subsystem is responsible for executing a recovery action for failures that occur in the gateway device and receives recovery actions from the high availability task subsystem. Shared configuration task subsystem provides the gateway device with an ability to set, retrieve, and receive notification of gateway configuration parameter changes and is responsible for storing configuration data for the applications running within the gateway device. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the gateway, which include creating separate VPN contexts, starting IP services within a VPN context, managing IP pools and subscriber IP addresses, and distributing the IP flow information within a VPN context. In some embodiments, within the gateway device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a gateway device can include any processing determined by the context. For example, packet processing may involve high-level data link control (HDLC) framing, header compression, and/or encryption. In certain embodiments, the software is stored on a computer readable medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Figure 3:
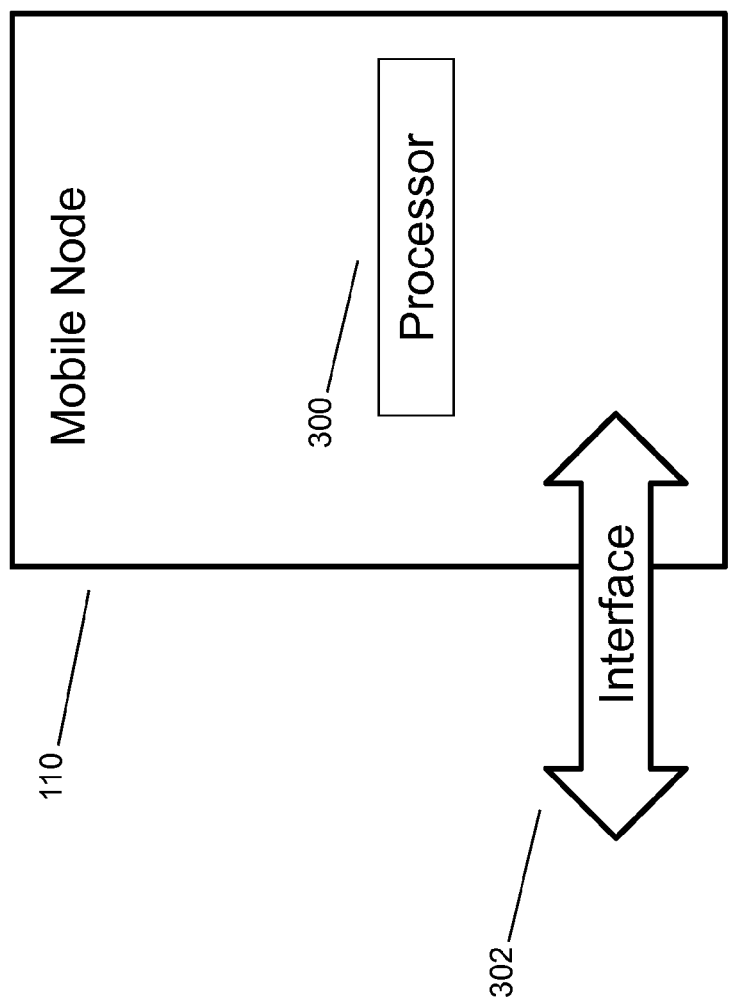
FIG. 3 illustrates a mobile node for accessing a network in accordance with some embodiments.

FIG. 3 illustrates a mobile node for accessing a network. FIG. 3 includes mobile node 110, processor 300, and interface 302. Processor 300 may be, for example, a general or special purpose-processing unit. Interface 302 may be, for example, a CDMA interface or a WiFi interface.

What is claimed is:

1. A method comprising:
a mobile node transmitting one or more keys to a first wireless access gateway using a first radio access technology, wherein the one or more keys are unchanging identifiers that are specific to the mobile node;
the mobile node receiving from the first wireless access gateway a first home address that is a function of an interface identifier that is determinable as a function of the one or more keys;
the mobile node transmitting the same one or more keys to a second wireless access gateway remote from the first wireless access gateway using a second radio access technology different from the first radio access technology; and
the mobile node receiving from the second wireless access gateway a second home address that is a function of the interface identifier.

2. The method of claim 1, further comprising:
the mobile node receiving a home agent binding from a home agent; and
the mobile node communicating tunneled payload information to and from the home agent.

3. The method of claim 2, wherein the payload information communicated to and from the home agent is provided to and from a correspondent node by the home agent.

4. The method of claim 1, wherein the mobile node establishes a session when communicating with the first wireless access gateway and maintains the session when communicating with the second wireless access gateway.

5. The method of claim 1, wherein the first radio access technology and the second radio access technology both include protocols to access the keys from the mobile node.

6. The method of claim 1, wherein the transmitting of one or more keys includes transmitting one or more of the following: an MSID (mobile subscriber identification), an ESN (electronic serial number), a MEID (mobile equipment identification), an IMEI (international mobile equipment identity), a NAI (network access identifier), and a username.

7. The method of claim 1, wherein the mobile node is a dual mode or multi-mode device.

8. A mobile node comprising:
one or more interfaces configured to communicate with a first wireless access gateway using a first radio access technology and a second wireless access gateway remote from the first wireless access gateway using a second radio access technology; and
a processor configured to transmit one or more keys to the first wireless access gateway using the first radio access technology, wherein the one or more keys are unchanging identifiers that are specific to the mobile node, receive from the first wireless access gateway a first home address that is a function of an interface identifier that is determinable as a function of the one or more keys, transmit the same one or more keys to the second wireless access gateway using the second radio access technology, and receive from the second wireless access gateway a second home address that is a function of the interface identifier.

9. The mobile node of claim 8, wherein the processor is further configured to receive a home agent binding from a home agent and communicate tunneled payload information to and from the home agent.

10. The mobile node of claim 9, wherein the payload information communicated to and from the home agent is provided to and from a correspondent node by the home agent.

11. The mobile node of claim 8, wherein the mobile node is configured to establish a session when in communication with the first wireless access gateway and to maintain the session when in communication with the second wireless access gateway.

12. The mobile node of claim 8, wherein the mobile node is configured to provide access to the keys using both the first radio access technology and the second radio access technology.

13. The mobile node of claim 8, wherein the keys include one or more of the following: an MSID (mobile subscriber identification), an ESN (electronic serial number), a MEID (mobile equipment identification), an IMEI (international mobile equipment identity), a NAI (network access identifier), and a username.

14. The mobile node of claim 8, wherein the mobile node is a dual mode or multi-mode device.

15. Software encoded on one or more non-transitory computer-readable media and when executed on a mobile node capable of communicating with a first wireless access gateway using a first radio access technology and a second wireless access gateway remote from the first wireless access gateway using a second radio access technology different from the first radio access technology operable to:
transmit one or more keys to the first wireless access gateway using the first radio access technology, wherein the one or more keys are unchanging identifiers that are specific to the mobile node;
receive from the first wireless access gateway a first home address that is a function of an interface identifier that is determinable as a function of the one or more keys;
transmit the same one or more keys to the second wireless access gateway using the second radio access technology; and
receive from the second wireless access gateway a second home address that is a function of the interface identifier.

16. The software of claim 15, further comprising software operable to:
receive a home agent binding from a home agent; and
communicate tunneled payload information to and from the home agent.

17. The software of claim 16, wherein the payload information communicated to and from the home agent is provided to and from a correspondent node by the home agent.

18. The software of claim 15, further comprising software operable to establish a session when communicating with the first wireless access gateway and maintain the session when communicating with the second wireless access gateway.

19. The software of claim 15, further comprising software operable to provide access to the keys using the first radio access technology or the second radio access technology.

20. The software of claim 15, wherein the keys include one or more of the following: an MSID (mobile subscriber identification), an ESN (electronic serial number), a MEID (mobile equipment identification), an IMEI (international mobile equipment identity), a NAI (network access identifier), and a username.

* * * * *